United States Patent [19]

Gardner

[11] 4,316,835

[45] Feb. 23, 1982

[54] POLYESTER RESIN COMPOSITIONS

[75] Inventor: Hugh C. Gardner, Somerville, N.J.

[73] Assignee: Union Carbide Corporation, New York, N.Y.

[21] Appl. No.: 136,421

[22] Filed: Apr. 16, 1980

Related U.S. Application Data

[63] Continuation-in-part of Ser. No. 34,997, May 1, 1979, abandoned.

[51] Int. Cl.$^3$ .............................................. C08L 67/00
[52] U.S. Cl. .................................. 260/40 R; 525/43; 525/48; 525/49; 525/425; 526/192; 526/261; 526/271; 526/281; 526/317; 528/306; 525/39
[58] Field of Search ............... 526/271, 261, 340, 192, 526/303, 204, 332, 281, 317, 336, 303, 240; 528/272, 306; 525/34, 36, 43, 48, 49, 425; 260/40 R

[56] References Cited

U.S. PATENT DOCUMENTS

| | | | |
|---|---|---|---|
| 2,813,055 | 11/1957 | Nischk et al. | 525/34 |
| 3,320,336 | 5/1967 | Duke et al. | 525/49 |
| 3,373,144 | 3/1968 | Janssen et al. | 528/306 |
| 3,466,264 | 9/1969 | Hayemeyer et al. | 528/306 |
| 3,723,390 | 3/1973 | Carpenter et al. | 526/303 |
| 3,766,129 | 10/1973 | Pesez | 260/40 R |
| 3,784,586 | 1/1974 | Thomas et al. | 525/21 |
| 4,137,279 | 1/1979 | Smith et al. | 525/49 |
| 4,229,559 | 10/1980 | Cotter et al. | 528/272 |

FOREIGN PATENT DOCUMENTS 2000494  1/1979  United Kingdom ................. 525/49

*Primary Examiner*—J. Ziegler
*Attorney, Agent, or Firm*—Donald M. Papuga

[57] ABSTRACT

This invention involves a curable liquid mixture comprising (a) a polyester of the following formula:

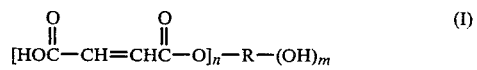

wherein n has an average value between about 1.5 and about 2, m is 2-n, R is the hydroxyl-free residue of a predominantly hydroxyl terminated polyester obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl, 2,2-dimethyl-3-hydroxypropionate, the ethylene and propylene oxide derivatives of 2,2-bis-(4-hydroxyphenyl)propane, and mixtures thereof, and mixtures of ethylene glycol and said diols, with a dicarboxylic acid or anhydride selected from the class consisting of maleic acid and anhydride, fumaric acid, ortho-phthalic acid and anhydride, isophthalic acid, terephthalic acid, carbic acid and anhydride, and mixtures thereof, (b) maleic anhydride and (c) an ethylenically unsaturated monomer which forms a homogeneous mixture with and is copolymerizable with (a) and (b), and wherein the molar ratio of polymerizable double bonds in (c) as compared to those in (a) plus (b) is between about 1 and about 3.6.

These compositions have fast cure speeds and afford fiber reinforced composites with high stiffness and strength.

9 Claims, No Drawings

POLYESTER RESIN COMPOSITIONS

This application is a Continuation-In-Part Application of Ser. No. 034,997, filed May 1, 1979, and now abandoned.

This invention is directed to a curable composition comprising a particular polyester, maleic anhydride, and an ethylenically unsaturated monomer.

The crosslinkable polyesters in these compositions are characterized by a special structure in which more than about 75 percent of the terminal groups are half acid ester groups derived from maleic anhydride.

Fiberglass has been widely used as a reinforcement in the manufacture of thermoset molded articles. These types of articles have been termed "Glass Reinforced Plastics" (GRP) and "Glass Fiber Reinforced Plastics" (GFRP).

Unsaturated polyester resins are used primarily as the resin component in many of these glass reinforced thermoset plastics. They consist of unsaturated polyesters dissolved in a polymerizable ethylenically unsaturated monomer. Typically, these unsaturated polyesters are formed by reacting an unsaturated diacid (or anhydride) with a nearly equivalent amount of dihydric alcohol at temperatures above about 200° C. for several hours. Maleic anhydride is the most common acid component utilized. The dihydric alcohols which are commonly used to make these polyesters include ethylene glycol, 1,2-propylene glycol, dipropylene glycol, diethylene glycol, and the like. Modifying amounts of other diacids, such as phthalic acid, isophthalic acid, terephthalic acid, or adipic acid are also commonly employed. Maleic anhydride and phthalic anhydride are two anhydrides that are often used. Unsaturation which is provided by maleate or fumarate groups within the backbone of the polyester takes part in the crosslinking, or curing, or unsaturated polyester resins.

Commercial two stage unsaturated polyesters are made with the diols and diacids specified in this application. These materials are typically made by a two step process wherein the saturated or aromatic diacid component is reacted with an excess of diol at temperatures above 200° C. When the acid number of the mixture falls below about 20, the unsaturated diacid or anhydride component is added to the entire reaction mixture in a molar ratio of about 1 mole of acid for every 2 moles of OH. The polymerization is continued until the unsaturated component has been converted largely to diesters. Molecular weight build up accompanies this process. Accordingly, polyesters with molecular weights (Mn) of about 1000 to 5000 are produced. The chains are terminated with carboxyl groups and hydroxyl groups. The acid numbers of commercial polyesters are typically in the range of 10 to 40. Often hydroxyl numbers are slightly higher. Virtually no unreacted maleic anhydride is present in commercial resins.

These aforedescribed polyester resins have been employed in the manufacture of a variety of glass reinforced products by different types of processes. The processes of forming glass reinforced products are generally in two categories, i.e., wet lay-up and thickened processes. Wet lay-up processes include the following steps: pre-impregnation of a fibrous mass with resin, followed by compression molding; preforming in which cut fiber and resin are sprayed onto a mold form itself; mat molding, in which liquid resin is poured onto a mat while the mat is disposed in a compression mold; bulk molding, in which a non-thickened mixture of staple fiber and polyester resin are poured into a mold.

A novel process for producing fiber reinforced compositions by injecting resin into a mold containing a fibrous web is described in U.S. Patent Application Ser. No. 035,011 entitled "Molding Process and Apparatus Therefore", and filed on May 1, 1979 in the name of R. Angell, Jr., which is incorporated herein by reference. In this application a process for rapidly fabricating fiber reinforced thermoset resin articles is described. The fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold. A major requirement for the process, as described in said U.S. Patent Application Ser. No. 035,011, is low resin viscosity to avoid movement of the reinforcing fibers during resin injection. Many types of resins can be used in this process including polyesters, epoxides and polyurethanes.

For many commercial applications, a further requirement is that the resin formulation cure rapidly, since the curing step is rate-limiting in making composite articles by this process.

The strength of a fiber reinforced composite is determined by the strength of the matrix and that of the interface. In many thickened process, the interfacial strength is enhanced by the long contact time between the fiber and uncured resin prior to molding. In the process of Ser. No. 035,011, contact between resin and fibers is limited to the time in the mold. Therefore, there is less opportunity to build interface strength.

It has been found that the compositions of this invention which contain polyesters of structure (I) and a specific ratio of double bonds cure rapidly. It has also been unexpectedly found that the compositions of this invention afford composites with higher mechanical properties then are obtained with other types of unsaturated polyesters.

Molecuar structures derived from the reaction of a dicarboxylic acid and a dihydric alcohol are described by Thomas et al., U.S. Pat. No. 3,784,586, patented Jan. 8, 1974. Thomas et al. depicts the reaction of two moles of maleic anhydride with one mole of dihydric alcohol to produce a composition which is characterized as a copolymerizable oligoester having maleic acid end groups in combination with vinyl monomers and a method for preparing the composition. According to the patent, maleic anhydride is reacted with one or more polyhydroxylated compounds in the ratio of a mole of maleic anhydride per hydroxyl group of the polyhydroxylated compound or compounds at a temperature within the range of 50° C. to 100° C. until the reaction mixture has a hydroxyl number below or equal to 20. Thereafter, at a temperature between room temperature and 100° C., a cross-linking vinyl monomer and a polymerization inhibitor are added. According to the patent, it is essential that the reaction temperature between maleic anhydride and polyhydroxylated compound not exceed 100° C.

The compositions of this invention are based on the reaction of maleic anhydride with a hydroxyl terminated polyester. These polyesters contain at least two ester bonds and are formed by a high temperature reaction between polyols and acids. They may contain unsaturation and can have higher molecular weights than are found with typical dihydric alcohols. Furthermore, the products of the reaction between the hydroxyl terminated polyester and maleic anhydride form a liquid mixture with styrene at room temperature.

U.S. Pat. No. 2,813,055 describes the preparation of branched polyesters from the reaction of dicarboxylic acids or their anhydrides and a trihydric alcohol. The resulting polyesters are branched and contain essentially only hydroxyl end groups. The hydroxyl groups of this polyester are then reacted with maleic anhydride to terminate the polyester with carboxyl groups. The polyester can be reacted with styrene. The resulting products are employed as adhesives for bonding all types of materials, especially metals. This patent teaches that polyesters made from reactants containing ether groups are especially preferred.

U.S. Pat. No. 2,824,821 describes polyesters similar to those of U.S. Pat. No. 2,813,055 although they may be linear and do not require ether groups in their structure. The polyester compositions of U.S. Pat. No. 2,824,821 are used as adhesives for bonding all types of materials, especially metals. Neither patent teaches that the compositions are suitable for making rigid fiber-reinforced composite articles. In addition, these patents do not describe or suggest a preferred molar ratio of polymerizable double bonds in the ethylenically unsaturated monomer to those contained in the other reactants in the system which results in optimum cure speeds, as in the instant invention.

THE INVENTION

This invention is directed to a curable liquid mixture comprising (a) a polyester of the formula:

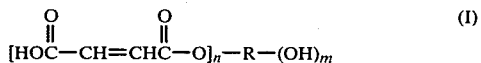
(I)

wherein n has an average value between about 1.5 and about 2, m is 2-n, R is the hydroxyl-free residue of a predominantly hydroxyl terminated polyester obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl, 2,2-dimethyl-3-hydroxypropionate, the ethylene and propylene oxide derivatives of 2,2-bis-(4-hydroxyphenyl)propane, and mixtures thereof, and mixtures of ethylene glycol and said diols, with a dicarboxylic acid or anhydride selected from the group consisting of maleic acid and anhydride, ortho-phthalic acid and anhydride, iso- phthalic acid, terephthalic acid, fumaric acid, carbic acid and anhydride, and mixtures thereof, (b) maleic anhydride and (c) an ethylenically unsaturated monomer which forms a homogeneous mixture with and is copolymerizable with (a) and (b), and wherein the molar ratio of polymerizable double bonds in (c) as compared to those in (a) plus (b) is between about 1 and about 3.6.

Cured articles made from the composition of this invention have higher mechanical properties compared to articles produced from polyesters with higher molecular weights and lower acid numbers.

Compositions of the instant invention possess faster cure speeds than formulations which contain polyesters with structure (I) but a molar ratio of polymerizable double bonds in (c) versus (a) plus (b) in excess of 3.6.

The polyesters depicted in formula (I) are distinct from commercial two stage unsaturated polyesters. The former possess higher acid numbers and lower molecular weights due to the stoichiometry of about 0.75 to 1.2 moles of maleic anhydride per mole of hydroxyl. In two stage commercial polyesters, a molar ratio of 0.5 moles of maleic anhydride per hydroxyl is typically used in the second step.

The compositions of this invention are also distinct from commercial unsaturated polyester resins in that they contain unreacted maleic anhydride.

The polyester of formula (I) are prepared by a stepwise process. The first step is the formation of a relatively low molecular weight polyester which is predominantly hydroxyl terminated. This polyester is thereafter reacted with maleic anhydride. This results in carboxyl termination of a substantial portion of the polyester hydroxyl groups and provides ethylenic unsaturation at the ends of the polyester chain. A small portion of the maleic anhydride remains unreacted due to the equilibrium nature of said reaction. This reaction mixture is thereafter mixed with an ethylenically unsaturated monomer. This monomer is capable of both forming a homgeneous mixture with and is copolymerizable with the carboxyl terminated polyester and maleic anhydride.

The predominantly hydroxyl terminated polyester used in this invention to produce the carboxyl terminated polyester is typically prepared from (a) a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydrodxypropionate, the ethylene and propylene oxide derivatives of 2,2-bis(4-hydroxyphenyl)propane, and mixtures thereof and mixtures of ethylene glycol and the aforementioned diols and (b) a dicarboxylic acid or anhydride selected from the class consisting of maleic acid and anhydride, fumaric acid, ortho-phthalic acid and anhydride, isophthalic acid, terephthalic acid, carbic acid and anhydride and mixtures thereof. The diol and dicarboxylic acid or anhydride and heated until a polyester is formed possessing an acid number of less than about 25. When the molar ratio of diols to dicarboxylic acids is greater than about 1.5, the hydroxyl number is typically in excess of about 65. Hydroxyl numbers for the hydroxyl terminated polyester can be as high as 250 and greater. Polyester esterification catalysts such as amines or tin compounds may optionally be used to increase the rate of formation of the polyester.

Amine catalysts suitable for use in the preparation of the predominantly hydroxyl-terminated oligomers include by way of illustration, the following:

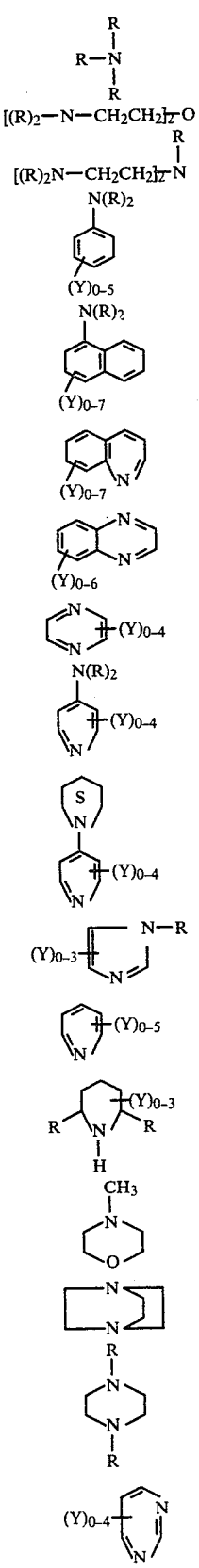

wherein the R's are independently selected from alkyl of 1 to 8 carbon atoms such as, $CH_3$, $C_2H_5$, $C_3H_7$, $C_4H_9$, and aralkyl of 7 to 15 carbon atoms such as

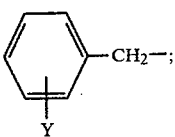

Y is independently selected from alkyl of 1 to 4 carbon atoms, alkoxy of 1 to 4 carbon atoms and halogen. Also included herein are 1,5-diazabicyclo [5.4.0]-undec-5-ene and 1,5-diazabicyclo [4.3.0]-non-5-ene.

Suitable tin compounds are organic tin salts or oxides which are typically employed as catalysts in the polyester art or other arts such as, the manufacture of urethane foams, the conversion of caprolactone into polycaprolactone in the presence of an active hydrogen compound, and the like. A specific illustration of a number of such tin compounds are stannous octoate, dibutyltin oxide, dibutyltin dilaurate, and a solution of tin (II) bis(trifluoromethylsulfonate) sold by the Minnesota Mining and Manufacturing Company, Minneapolis, Minn. under the trademark of "L-4429."

The catalysts are used in amount of from about 0.01 to about 3.0 percent of the weight of the initial reactants.

The polyester of formula (I) is conveniently prepared by reacting the predominantly hydroxyl terminated oligomer with maleic anhydride in a stoichiometric ratio of one mole of hydroxyl per 0.75 to 1.2 moles of maleic anhydride. A catalyst may optionally be used to carry out this reaction. These catalysts are basic compounds. The basic compounds are selected from the amines described, supra, a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliters of water the pH is greater than 7.

A preferred basic compound is a secondary or tertiary amine. These amines have $pK_b$'s in the range of 3 to 12. The base is used in amounts of from about 0.005 to about 5 and preferably, from about 0.01 to about 2 weight percent based on the combined weight of the hydroxyl terminated polyester and the maleic anhydride used in making the compositions of this invention.

In this invention, all of the terminal carboxyl groups in the polyester (I) can be in either the maleate form or the fumarate form. Generally, greater than 75 percent of the terminal carboxyl groups will possess the maleate structure.

The polyesters of structure (I) form homogeneous liquid mixtures with the ethylenically unsaturated monomer and residual maleic anhydride. In contrast, not all maleic acid terminated oligoesters of simple polyols, as described by Thomas, et al. in U.S. Pat. No. 3,784,586 are soluble. For example, the oligoester made from one mole of 1,2-propylene glycol and 2 moles of maleic anhydride does not form a homogeneous solution with an equal portion by weight of styrene. It has been found that low molecular weight polyols such as 1,2-propylene glycol, diethylene glycol, and dipropylene glycol can be used in making soluble acid-terminated species by polymerizing said glycols with diacids or anhydrides to form hydroxyl-terminated polyesters. The solubility of the polyesters of structure (I) derived therefrom increases as the molecular weight of the precursor hydroxyl terminated polyester increases. However, if a saturated diacid or anhydride is used, the proportion of polymerizable double bonds in the composition is decreased as polyester molecular weight increases. Thus, for a fixed weight percent of ethylenically unsaturated monomer in the composition, the molar ratio of polymerizable double bonds in the ethylenically unsaturated monomer to that of the remainder of the composition increases. Consequently, the cure speed of the composition is reduced.

A preferred method of making compositions which are soluble and have fast cure speeds and high temperature strength is to use unsaturated diacids or anhydrides, such as maleic anhydride, in making the hydroxyl-terminated polyester. These reactants provide internal unsaturation which allows the molar ratio of polymerizable double bonds in the ethylenically unsaturated monomer to that of the remainder of the composition to be within the range specified in this invention.

Additionally, mixtures of hydroxyl terminated polyesters wherein one polyester possesses internal unsaturation and the other does not, are suitable in preparing the compositions of this invention.

The term polymerizable double bond as used herein refers to non-aromatic carbon-carbon unsaturation. These double bonds are polymerizable by well known free radical processes.

The ethylenically unsaturated monomer employed in the composition of this invention is one which forms a liquid homogeneous mixture with and is copolymerizable with the polyester depicted by formula (I) and maleic anhydride.

Suitable ethylenically unsaturated monomers which may be employed in the practice of this invention are one or more monomers which contain a $-CH=C<$ group, and preferably a $CH_2=C<$ group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also, the monomers include vinyl ethers and esters, e.g., vinyl acetate, vinyl propionate, methyl vinyl ether, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene.

The predominantly hydroxyl terminated polyester of this invention is prepared by heating an excess of one or more of the diols with one or more of the dicarboxylic acids or anhydrides. The mixture is heated at a temperature of from about 150° C. to about 250° C. until a polyester is formed possessing an acid number of less than about 25, preferably less than about 15 and in the most desirable embodiment, less than about 5. Under these conditions, the hydroxyl number is typically in excess of about 65, and most desirably in excess of about 100. Hydroxyl numbers for the polyester can be 250 or greater.

Typically, the reaction is carried out for a period ranging from about 4 to about 24 hours. Standard techniques employed in the art for making polyester resins may be employed to make the hydroxyl terminated polyester. Frequently, to control the molecular weight of the product, a 25 to 500 percent molar excess of the diol is employed in the reaction. When the desired degree of esterification of the acid has been achieved, this excess may be stripped therefrom by, for example, vacuum distillation. The amount of unreacted diol remaining in the product amounts to no more than about 10 percent by weight.

The polyester of formula (I) is prepared by reacting the hydroxyl terminated polyester and maleic anhydride in a molar ratio of about 0.75 to about 1.2 moles of maleic anhydride per mole of polyester hydroxyl. Since the reaction between the hydroxyl groups and maleic anhydride is reversible, a portion of the anhydride remains unreacted and is part of the final composition. In the absence of catalyst, the reaction typically requires from about 0.5 to about 8 hours at temperatures of from about 80° C. to about 150° C.

The reaction is carried out until mor than about 75 percent of the maleic anhydride has reacted with the hydroxyl terminated polyester. At 120° C., this is generally achieved in about 3 hours. Under these conditions the maleic anhydride which reacts with the hydroxyl terminated polyester is present mainly as a maleate half ester. Less than 5 percent of the maleic anhydride reacts to form maleate diesters.

In the presence of a catalyst as heretofore described, the reaction of the hydroxyl terminated polyester oligomer and maleic anhydride can be carried out at temperatures of from about 60° to about 130° C. for a period of from 0.2 to about 4 hours.

After more than about 75 percent of the maleic anhydride has reacted with the polyester oligomer, the reaction mixture is cooled to a temperature of about 120° C. or less. An ethylenically unsaturated monomer is then added as the reaction mixture is agitated. The temperature of the reaction mixture is lowered by the addition of the ethylenically unsaturated monomer. The homogeneous liquid mixture is then cooled to room temperature, or to whatever intermediate temperature is desired.

The reaction mixture containing the polyester depicted in formula (I) and unreacted maleic anhydride can be characterized by the use of acid numbers. The acid number is defined as the milligrams of KOH needed to neutralize 1 gram of product. Two methods for determining acid numbers are used. The first involves dissolving a sample in a pyridine/methanol mixture and titrating against aqueous KOH. The second involves dissolving a sample in aqueous pyridine and then titrating against KOH. The former determines maleic anhydride as a monoacid; the latter determines maleic anhydride as a diacid.

The two methods permit the determination of maleic anhydride in the mixture, and the acid number of the polyester of formula (I). The amount of maleic anhydride present in the composition can be determined, as shown in formula (II) as follows:

$$\text{Mole \% of unreacted maleic anhydride} = \left[ \frac{\text{Acid No.} - \text{Acid No.}}{\text{(aqueous pyridine)} \quad \text{(pyridine/methanol)}}{\text{Acid No. (pyridine/methanol)}} \right] \times 100 \quad \text{(II)}$$

The acid number of the polyester of formula (I) can be determined by use of formula (III) as follows:

$$\begin{array}{ll} \text{Acid No.} & = \text{Acid No. (pyridine/methanol)} - \\ \text{of (I)} & [\text{Acid No. (aqueous pyridine)} - \text{Acid No. (pyridine/methanol)}] \end{array} \quad \text{(III)}$$

When measured by the aqueous pyridine method, the acid numbers of polyester/maleic anhydride reaction product mixtures range from about 70 to about 320. Preferably they are in the range of 80 to 250. By the pyridine/methanol mixed solvent method, the preferred range is from about 65 to about 240.

The acid number of the polyester of formula (I) ranges from about 60 to about 240 as determined by use of formula (III).

The molecular weight (Mn) of the polyester of formula (I) ranges from about 400 up to about 1700, and preferably from about 500 to about 1400.

The compositions of this invention are low viscosity liquids. When they contain 30 percent by weight of styrene as the ethylenically unsaturated monomer, the solution viscosities at 23° C. range from about 30 to about 1400 centipoises. At higher styrene contents, the viscosities are lower.

The combination of the polyester of formula (I) and and maleic anhydride are used in amounts of from about 85 to about 30, preferably from about 80 to about 35 weight percent and the ethylenically unsaturated monomer is used in amounts of from about 15 to about 70, preferably from about 20 to about 65 weight percent.

At least 75 weight percent and preferably greater than 80 weight percent of maleic anhydride is present as the half ester in formula (I).

In order to avoid premature crosslinking reactions in the composition, it is desirable to add polymerization inhibitors. These include tertiary-butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 600 parts per million by weight.

The compositions of this invention can be cured by free radical mechanisms such as, electron beam radiation, actinic radiation, azo and peroxide curing agents such as those which are described by Gallagher, et al "Organic Peroxides Review", Plastics Design & Processing, July, 1978, pages 38–42, and August, 1978, pages 60–67, inclusive. The technology disclosed in those two articles are incorporated herein by reference. The choice of the specific peroxide or azo initiators for the purpose of curing the composition of this invention is within the purview of those having skill in this art. The manner in which such peroxides and azo initiators effect a desirable cure is generally characterized in the aforementioned articles.

Illustrative of a few such curing agents are 2,2'-azobis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexanoate, t-butyl-peroctoate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.25 to about 5.0 weight percent, preferably from about 0.5 to about 2.5 weight percent, and most preferably, from about 0.75 to about 2.0 weight percent, based on the weight of the polyester (I), maleic anhydride and the ethylenically unsaturated monomer.

The fibers which are suitable for use in this invention as reinforcing agents have a melting point or a glass transition temperature above about 130° C. These fibers include fiberglass, carbon fibers, aromatic polyamide fibers (such as aramid fibers sold by E. I. DuPont Nemours, Wilmington, Delaware under the trademark of Kevlar), metal fibers, such as aluminium and steel fibers, boron fibers and the like.

The carbon fibers include those having a high Young's modulus of elasticity and high tensile strength. These carbon fibers may be produced from "graphitizable" materials such as is described in U.S. Pat. No. 4,005,183.

The preferred fibers are fiberglass, carbon fibers and aromatic polyamide fibers.

The fibers which are suitable for use in this invention have a length of at least ¼ inch and the average length is at least ½ inch. Fibers with different lengths exceeding ¼ inch may be used, provided that at least about 50 percent of the fibers have lengths greater than ½ inch. Preferred fibers lengths are from 1 to 2 or more inches. Continuous filaments may also be used.

The composition contains from about 15 to about 80, preferably from about 35 to about 80, and most preferably from about 35 to 70 weight percent of fiber.

The compositions of this invention are particularly useful for the manufacture of rigid fiber reinforced molded articles. A preferred procedure for producing a molded article from this composition is described in copending U.S. Patent Application Ser. No. 035,011, supra.

In said U.S. Patent Application Ser. No. 035,011 the apparatus for producing the molded article comprises (a) a heatable matched metal die mold containing one or more cavities therein with means for opening said mold to expose said cavities, and means for controlling the injection of a thermosettable organic liquid to said cavities when the mold is closed, (b) means associated with said mold, whereby an interlocked mass of fibers is provided in a portion of the cavity thereof, when the mold is open to receive such cavities and prior to the injection of thermosettable organic liquid to such cavities when the mold is closed, (c) accumulator means associated with said mold which can contain a thermosettable organic liquid transportable to means for controlling injection of said thermosettable liquid to such cavities, (d) cooling means associated with the means for controlling the injection of such liquid to such cavities, whereby the temperature of the liquid in such injection means is maintained substantially below the temperature of the mold.

The fiber reinforced composite articles made with the compositions of this invention possess high stiffness and strength. They are particularly suitable for use as appliance housings and as automotive parts.

The hydroxyl terminated polyester oligomer used in the preparation of the polyester of formula (I) can be prepared from reactants other than diols. For example, a hydroxyl terminated oligomer can be obtained by reacting an excess of propylene oxide with an anhydride by the process described in U.S. Pat. No. 3,723,390 patented Mar. 27, 1973. To make the compositions of this invention, the hydroxyl-terminated oligomer must then be further reacted with maleic anhydride in a molar ratio of 0.75 to 1.2 moles of anhydride per hydroxyl group.

The hydroxyl terminated oligomer may also be prepared from the diol and the lower alkyl esters of aromatic dicarboxylic acids, such as dimethyl terephthalate and dimethyl isophthalate as described in UK Patent application No. 2,000,499A, published Jan. 10, 1979.

Minor amounts of diols such as 2,2,4-trimethyl-1,3-pentanediol, 1,4-cyclohexane dimethanol, 1,3-butanediol can be used to prepare the polyesters of formula (I).

Similarly, minor amounts of polyols containing 3 or more hydroxyl groups may be employed such as trimethylol propane, 1,2,6-hexanedtriol, and glycerol. When these reactants are used, branched polyesters are formed.

In like manner, modifying amounts of linear saturated diacids such as, adipic acid, suberic acid and azelaic acid may also be used in the practice of this invention. Tricarboxylic acids such as trimellitic acid may also be used.

EXAMPLES

The following examples serve to illustrate specific embodiments of this invention and it is not intended that the invention shall be limited by the examples.

In the following examples, the ethylenically unsaturated monomer is exemplified as styrene. The molar ratio of polymerizable double bonds in the ethylenically unsaturated monomer to those contained in unreacted maleic anhydride and polyester (I) is referred to as the styrene/non-styrene double bond ratio.

EXAMPLE 1

This example describes the preparation of a hydroxyl-terminated polyester oligomer containing internal unsaturation.

A 5-liter flask equipped with a paddle stirrer, thermometer, nitrogen inlet and outlet, a 12 inch packed distillation column, and an electric heating mantle was charged with 294 g of maleic anhydride, 443 g of phthalic anhydride, 1249 g of neopentyl glycol, and 228 g of propylene glycol. The mixture was carefully warmed to melt all of the reactants. Then it was heated at 180°–206° C. for nine hours as 84 g of water distilled from the mixture. The residue in the flask was then heated under vacuum to remove excess glycol and additional water. Almost all of the glycol in the distillate was neopentyl glycol. The oligomer remaining in the flask had a hydroxyl number of 246, and an acid number of 19 in aqueous pyridine. NMR analysis revealed that the ratio of maleate to fumarate ester groups in the oligomer was about 3 to 7. The molar ratio of neopentyl glycol to propylene glycol in the product was 2.6 to 1.

EXAMPLE 2

A 275 g portion of the unsaturated oligomer of Example 1 was reacted with 118 g of maleic anhydride in the presence of 0.4 g of pyridine for 2 hours at 90° C. The amber product was cooled to 70° C. and blended with 393 g of styrene containing 0.20 g of methyl hydroquinone. An amber homogeneous solution resulted which had a styrene/non-styrene double bond ratio of 2.2. This resin had a viscosity of 27 centipoises at 25° C. and an acid number of 87 in a pyridine/methanol mixed solvent.

EXAMPLE 3

Preparation of a polyester oligomer from maleic anhydride and propylene glycol wherein the hydroxyl terminated polyester oligomer formed contains internal unsaturation.

A 3 necked, 5 liter flask equipped as described in Example 1 was charged with 1204 grams of maleic anhydride and 1969 grams of propylene glycol. The mixture was heated to 168° C. for about two hours, at which point distillate began to appear in the receiver. The mixture was maintained at 170° to 200° C. for two hours. Then the temperature was raised to 225° C. and held there for one hour. The amber solution was then cooled to 180° C. and subjected to a vacuum of 40 mm of mercury for one hour. The residue was inhibited with 0.50 grams of t-butyl catechol and allowed to cool to room temperature under a nitrogen atmosphere. The resulting polyester oligomer had an acid number of 2.3, a hydroxyl number of 294, and a molecular weight ($\bar{M}_n$) of 331.

NMR analysis of this polyester showed that the maleic anhydride containing components of the product had the following distribution:
  84 mole percent fumarates, and
  16 mole percent maleates.
No unreacted maleic anhydride was detected.

EXAMPLE 4

This example describes the reaction of maleic anhydride and a polyester oligomer in the presence of an amine catalyst.

A 2 liter flask equipped as in Example 2 was charged with 1000 grams of the polyester of Example 3 and 514 grams of maleic anhydride. These proportions afforded one mole of anhydride per mole of hydroxyl. The mixture was warmed to 60° C. and stirred as 1.47 ml of N-methylimidazole was added. The mixture immediately turned brown. The reaction temperature increased to 75° C. in 10 minutes without the application of an external heat source. Thereafter the mixture was maintained at 60° to 75° C. for four hours.

The acid number of the reaction product was 212 when measured in a pyridine/methanol mixed solvent. It was blended with increments of styrene monomer inhibited with methyl hydroquinone. Homogeneous mixtures resulted when the styrene content was between 20 and 35 percent by weight. Mixtures containing 40 to 50 percent of styrene consisted of two liquid layers. It is noted that this mixture requires 41.8 percent by weight of styrene to attain a styrene/non-styrene double bond molar ratio of 1.0 which is within the range specified for the compositions of this invention. A molar ratio of less than about 1.0 is not desirable since unreacted double bonds in the polyester remain after curing. This residual unsaturation results in poor chemical resistance of the polymer.

CONTROL A

This example describes the preparation of a polyester resin formulation which had a styrene/non-styrene double bond ratio in excess of 3.6.

To a 5 liter, 3 necked flask equipped with a paddle stirrer, nitrogen inlet and outlet, thermometer, a 12 inch vacuum jacketed distillation column packed with glass helices with a water cooled condenser above the distillation column, and a heating mantle was charged 885.0 grams (11.5 moles) of propylene glycol and 537.0 grams (4.0 moles) of dipropylene glycol. The solution was heated under nitrogen to 120° C., and then 832.0 grams (5.0 moles) of an 85/15 iso/terephthalic acid mixture was added. The acid number of the reaction mixture was initially 249. The mixture was heated at 160° C. for 6.5 hours and at 170° to 190° C. for 4 hours. At this point the reaction mixture was clear. It was heated for an additional 3.0 hours at 180° to 195° C. and then cooled to room temperature. The acid number was 31. The total weight of the sample was 2074 grams (yield=94.5 percent).

A 572 gram portion of the product was heated to 150° C. in a 4 necked, 1 liter flask fitted with a paddle stirrer suitable for vacuum distillation, a distillation head, a thermometer, and an electric heating mantle. A vacuum of 40 mm of mercury was applied and excess diol was removed over a 2 hour period. A total of 150 grams of distillate was collected. The light amber residue in the flask was analyzed. It had an acid number of 11.5 and a hydroxyl number of 114.

285 grams of the residue (which contained 0.58 moles of hydroxyl groups) was reacted with 59.6 grams (0.61 moles) of maleic anhydride in a 1 liter flask equipped with a paddle stirrer, thermometer, nitrogen inlet and outlet, and an electric heating mantle. Thus, the polyester oligomer was reacted with maleic anhydride in a ratio of 1.0 moles of hydroxyl group per 1.05 moles of maleic anhydride. The mixture was heated at 115° C. for 2 hours. At the end of this period, a sample was removed for analysis. The acid number of the product was 110 when measured in aqueous pyridine and 101 when measured in a pyridine/methanol mixed solvent. The mixture was treated with 103 mg of hydroquinone followed by the dropwise addition of 282 grams of styrene inhibited with 24 parts per million of t-butyl catechol. The resulting clear light yellow solution was cooled to room temperature. Its viscosity was determined to be 50 centipoises at 25° C. This resin formulation had a styrene/non-styrene double bond ratio of 4.4.

CONTROL B

This example describes the preparation of a polyester resin formulation which had a styrene/non-styrene double bond ratio in excess of 3.6. This Control differs from Control A in that another combination of diols and acids was used.

A 2 liter, 4 necked flask fitted with a paddle stirrer, an electric heating mantle, a nitrogen inlet, a thermometer, and a 12 inch vacuum jacked distillation column packed with glass helices was charged with 444.4 grams of phthalic anhydride and 501.7 grams of propylene glycol. The mixture was heated at 180° C. to 225° C. under a gentle flow of nitrogen for 3.5 hours. Then, an additional 50 grams of propylene glycol was added. The mixture was maintained at 225° C. for 3 more hours, and then allowed to cool.

A portion of the product was placed under a vacuum of 40 mm of mercury and heated at 110° C. for 2 hours to remove the excess glycol. The clear, colorless residue was a hydroxyl terminated polyester oligomer. This material possessed a hydroxyl number of 130 and an acid number of 1. The oligomer molecular weight was 856.

A 1 liter, 4-necked flask was charged with 351.8 grams of the polyester oligomer and 79.9 grams (0.815 moles) of maleic anhydride. This stoichiometry afforded one mole of maleic anhydride per mole of hydroxyl group. The mixture was heated at 120° C. for 2 hours. At the end of 2 hours, the product was cooled and analyzed by NMR spectroscopy. This analysis showed that the maleic anhydride containing components of the mixture had the following distribution:

20 mole percent unreacted maleic anhydride,
78 mole percent maleates, and
2 mole percent fumarates.

A portion of this mixture, weighing 235 g, was treated with 192 g of styrene and 0.07 g of hydroquinone. This resin formulation had a styrene/non-styrene double bond ratio of 4.2. The acid number of this resin was determined to be 69 by the aqueous pyridine method.

EXAMPLE 5

This example shows the preparation of a homogeneous resin formulation with a styrene/non-styrene double bond ratio between 1 and 3.6. This formulation was prepared by combining a predominantly acid-terminated polyester containing internal unsaturation with an acid-terminated polyester which did not contain internal polymerizable double bonds.

A homogeneous resin formulation was prepared by blending 100 g of the polyester resin of Control A,
25 g of the styrene-free acid-terminated polyester of Example 4, and
25 g of styrene.

The overall composition contained 47 percent by weight of styrene. It had a styrene/non-styrene double bond ratio of 2.5. It is noted that the acid-terminated polyester of Example 4 did not form a homogeneous mixture with 40 percent styrene. Therefore the presence of the other polyester in this formulation increases the solubility in styrene of the acid-terminated polyester from Example 4.

EXAMPLE 6

This example describes the preparation of a homogeneous resin formulation with a styrene/non-styrene double bond ratio between 1 and 3.6. This formulation was made by combining a predominantly acid-terminated polyester containing internal unsaturation with an acid-terminated polyester which did not contain internal polymerizable double bonds.

A homogeneous resin formulation was prepared by blending 20 g of the polyester resin of Control B,
5.5 g of the styrene-free acid-terminated polyester of Example 4, and
4.5 g of styrene.

The overall composition contained 45 percent by weight of styrene. It had a styrene/non-styrene double bond ratio of 2.2.

EXAMPLE 7

The cure speeds of polyester resins were measured using a gel time test described by A. S. Smith, 6th Conference of the Society of the Plastics Industry (SPI), Reinforced Plastics Division, Chicago, Ill., section 1, page 1.

The hardening properties for a resin are determined by observing the temperature versus time behavior of a sample of catalyzed resin in a test tube immersed in a bath at an elevated temperature. Typically, the bath temperature is 180° F. 1 part of benzoyl peroxide per 100 parts of resin is used. A test tube, 19×150 millimeters, is filled to a depth of three inches, and a needle thermocouple is inserted concentrically into the tube to a depth of about 1 ½ inches into the resin. The gel time is taken from a temperature curve and is the time between the 150° F. and 190° F. line. At the latter point, the polymerization of the resin has been initiated, most of the inhibitor in the system has been consumed, and the resin is substantially gelled. In most cases, the temperature rise after 190° F. is very rapid. The peak temperature is reached within a few minutes, indicating the completion of cure. For polyester resins, peak temperatures are often over 400° F.

The cure speed of polyesters can be determined by measuring the time between the 190° F. line and the peak temperature. This time is called the interval. Resins with the shortest intervals are preferred since they have the fastest cure speeds. It has been found that resins with intervals of less than about 3.5 minutes are preferred for making composites by the process as described in U.S. Patent Application, Ser. No. 035,011 supra, since they permit the use of shorter molding cycles.

The interval in the SPI gel time test is related to the styrene/non-styrene double bond ratio of a resin composition. Compositions of this invention which have styrene/non-styrene double bond ratios between about 1 and about 3.6 have intervals of less than about 3.5 minutes in the gel time test.

Table I lists the gel time test results for compositions of this invention and controls.

Control C contained the polyester of structure (I) as prepared in Example 2. However, the styrene content in Control C was 70 weight percent of the resin. In this formulation, the styrene/non-styrene double bond ratio was 5.2, which is outside the range of this invention. For Control C, the level of inhibitor in the resin was adjusted to 250 parts per million of methyl hydroquinone, the same as in the composition of Example 2.

Control D was a resin containing an unsaturated polyester derived from the condensation of 4.2 moles of maleic anhydride, 1.0 moles of phthalic anhydride, and 5.2 moles of propylene glycol at 220° C. for about 10 hours. The polyester had an acid number of 32, a hydroxyl number of 50, and a molecular weight of 1370. The resin contained 50 percent by weight of styrene. The inhibitor content was 380 parts per million of hydroquinone. The styrene/non-styrene double bond ratio was 2.0. However, the acid number was less than that of the polyesters of this invention.

Control E was a polyester resin which contained a polyester similar to that in Control D. This polyester was prepared by the condensation of isophthalic acid, maleic anhydride, propylene glycol and dipropylene glycol in a 1.0/2.0/2.3/0.8 molar ratio at 160°–210° C. for 16 hours. The polyester had a molecular weight of 1707 and an acid number of 31. The resin contained 45 percent styrene by weight, 165 parts per million of hydroquinone, and had a styrene/non-styrene double bond ratio of 2.2. The acid number of the polyester was less than that of the polyesters of this invention.

The styrene/non-styrene double bond ratio for a resin composition was obtained by dividing the moles of styrene in a given weight of resin by the moles of maleic anhydride used in making a particular polyester of structure (I). An adjustment was made for the by-product water which distilled from the mixture during the preparation of the hydroxyl-terminated polyester used to make the polyester of structure (I).

The data in Table I show that there is a direct correlation in the resin compositions between the styrene/non-styrene double bond ratio and the interval in the gel time test. The correlation is observed between the resins of Example 2 and Control C, the resins of Example 5 and Control A, and the resins of Example 6 and Control B. The resins of both Examples 5 and 6 contain a mixture of polyesters wherein one of the polyesters contains internal unsaturation and the other does not contain internal unsaturation.

The data for Controls D and E show that other polyester resins having styrene/non-styrene double bond ratios between 1 and about 3.6 also have intervals in the gel time test indicative of fast cure speeds. However, as shown in Example 8, fiber-reinforced composites molded from these resins exhibit inferior mechanical properties.

TABLE I

| Resin Formulation[a] Example | 2 | Control C | 5 | Control A | 6 | Control B | Control D | Control E |
|---|---|---|---|---|---|---|---|---|
| Styrene content (wt. %) | 50 | 70 | 47 | 45 | 45 | 45 | 50 | 45 |
| Styrene/non-styrene double bond ratio | 2.2 | 5.2 | 2.5 | 4.4 | 2.2 | 4.2 | 2.0 | 2.2 |
| Cure Characteristics | | | | | | | | |
| Gel time (min.) | 6.8 | 8.7 | 5.5 | 11.1 | 4.2 | 5.1 | 8.8 | 5.5 |
| Interval (min.) | 2.2 | 4.0 | 3.1 | 9.1 | 2.4 | 4.7 | 2.0 | 2.0 |
| Total Time (min.) | 9.0 | 12.7 | 8.6 | 20.2 | 6.6 | 9.8 | 10.8 | 7.6 |
| Peak temperature (°F.) | 447 | 464 | 419 | 284 | 444 | 383 | 468 | 459 |

[a]The resins contained 1.0 part by weight of benzoyl peroxide per 100 parts of resin. A bath temperature of 180° F. was used.

EXAMPLE 8

A series of fiber reinforced rigid composite articles (Composites A to D in Table II) were prepared by injecting thermosetting resin compositions into a web of randomly oriented one to two inch glass fibers compressed in a mold. The resin compositions were prepared by blending 140 g portions of the resins in Example 2 and Controls D and E with 0.5 phr (parts by weight per 100 parts) of Zelec UN mold release (an organophosphate mold release sold by E. I. duPont de Nemours, Wilmington, Del.) and 1.0 phr of t-butyl perbenzoate.

The dimensions of the mold cavity were 7×7×⅛ inches. The mold cavity was filled with 5 or 6 plies of Type AKM glass mat (supplied by PPG Industries, Pittsburgh, Penn.). The mold was heated to 140° C. The resin mixture was injected into the web of glass fibers under pressure in a period of 10 seconds or less. The pressure in the mold was 30 psi to 250 psi. The resin penetrated the glass web and wet the fibers before it formed a thermoset composition. The resin was cured for a period of 2 minutes. The mold was then opened and a cured composite part was removed. The composite was tested to determine its mechanical properties.

Table II shows the resin used, the styrene content of the resin composition as well as the acid number of the resin composition. Table II also shows the glass content of the composite as well as the properties of the composite, i.e., tensile strength, tensile modulus, and percent elongation as measured by ASTM D-638; and flexural strength and flexural modulus as measured by ASTM D-790. Two composites were made with resins having the composition of Example 2. The increase in properties observed in Composite B as compared to Composite A reflects the higher glass content in Composite B.

Comparison of Composites A, C, and D shows that the properties of the composite made with the composition of this invention (Composite A) are superior. Although all three resins had fast cure speeds as measured by the gel time test as in Example 7, the acid numbers of the resins of Controls D and E were outside the range specified for the compositions of this invention.

An attempt was made to prepare a composite using a formulation based on the resin of Control A. When the mold was opened after two minutes, a soft rubbery mass was found, indicating incomplete cure of the resin. The formulation has a styrene/non-styrene double bond molar ratio in excess of 3.6.

TABLE II

| Composite | A | B | C | D |
| --- | --- | --- | --- | --- |
| Resin Formulation | | | | |
| Example | 2 | 2 | Control D | Control E |
| Styrene content (wt. %) | 50 | 50 | 50 | 45 |
| Acid number (mg KOH/g) | 87$^a$ | 87$^a$ | 19 | 17 |
| Composite properties | | | | |
| Tensile strength (10$^3$ psi) | 23.5 | — | 20.2 | 22.3 |
| Tensile modulus (10$^6$ psi) | 1.46 | — | 1.29 | 1.35 |
| Elongation (%) | 1.9 | — | 2.0 | 1.9 |
| Flexural strength (10$^3$ psi) | 38.3 | 46.7 | 30.1 | 28.3 |
| Flexural modulus (10$^6$ psi) | 1.73 | 2.04 | 1.23 | 1.39 |
| Glass content (wt. %) | 53 | 58 | 53 | 53 |

$^a$measured in pyridine/methanol mixed solvent

What is claimed is:
1. A curable liquid mixture comprising:
(a) a polyester of the following formula

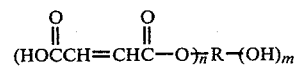

$$(\text{HOCCH}=\text{CHC}-\text{O})_n R - (\text{OH})_m \quad (I)$$

wherein n has an average value between 1.5 and about 2, m is 2-n, R is the hydroxyl-free residue of a predominantly hydroxyl terminated polyester obtained by the condensation of a diol selected from the class consisting of 1,2-propylene glycol, 1,3-butanediol, 2,2-dimethyl-1,3-propanediol, dipropylene glycol, diethylene glycol, the ethylene and propylene oxide derivatives of 2,2-bis-(4-hydroxyphenyl)-propane, and mixtures thereof, and mixtures of ethylene glycol and said diols, with a dicarboxylic acid selected from the class consisting of maleic acid, fumaric acid, ortho-phthalic acid, isophthalic acid, terephthalic acid, and carbic acid or anhydride selected from maleic anhydride, ortho-phthalic anhydride and carbic anhydride, and mixtures of said acids and anhydrides, (b) maleic anhydride, (c) an ethylenically unsaturated monomer which forms a homogeneous mixture with and is copolymerizable with (a) and (b), and wherein the molar ratio of polymerizable double bonds in (c) as compared to those in (a) plus (b) is between about 1 and about 3.6.

2. A composition as in claim 1, wherein the combination of the polyester of formula (I) and maleic anhydride are used in amounts of from about 30 to about 85 weight percent.

3. A composition as in claim 1, wherein the ethylenically unsaturated monomer is styrene.

4. A composition as in claim 1, wherein the ethylenically unsaturated monomer is used in amounts of from about 15 to about 70 weight percent.

5. A composition as in claim 1, wherein the polyester of formula (I) has an acid number greater than 60.

6. A composition as in claim 1, which contains a reinforcing fiber.

7. A composition as in claim 6 wherein the reinforcing fiber is selected from fiberglass, carbon fibers, or polyamide fibers.

8. A composition as in claim 1 wherein the composition contains from about 15 to about 80 weight percent of the reinforcing fiber.

9. A cured article prepared from the composition of claims 1, 6, 7, or 8.

* * * * *